(12) United States Patent
Chen et al.

(10) Patent No.: US 7,228,790 B2
(45) Date of Patent: Jun. 12, 2007

(54) SPOON BREWING APPARATUS

(75) Inventors: Yee Mau Chen, Tai Po, N.T. (HK); Sum Fat Poon, Tai Po, N.T. (HK)

(73) Assignee: Electrical and Electronics Limited, Tai Po, N.T. (HK)

( * ) Notice: Subject to any disclaimer, the term of this patent is extended or adjusted under 35 U.S.C. 154(b) by 270 days.

(21) Appl. No.: 10/776,971

(22) Filed: Feb. 11, 2004

(65) Prior Publication Data

US 2005/0172819 A1  Aug. 11, 2005

(51) Int. Cl.
*A47J 31/06* (2006.01)

(52) U.S. Cl. .................................. 99/302 R; 99/323

(58) Field of Classification Search .............. 99/302 R, 99/323, 295; 426/112, 115, 77, 82
See application file for complete search history.

(56) References Cited

U.S. PATENT DOCUMENTS

| | | | | |
|---|---|---|---|---|
| 4,429,623 A | * | 2/1984 | Illy | .............................. 99/295 |
| 4,882,982 A | * | 11/1989 | Muttoni | ....................... 99/295 |
| 5,150,645 A | | 9/1992 | Schiettecatte | |
| 5,628,902 A | | 5/1997 | Pytlik et al. | |
| 6,044,754 A | | 4/2000 | Fuentes | |
| 6,481,338 B1 | * | 11/2002 | Wai | ........................... 99/302 R |
| 6,840,158 B2 | * | 1/2005 | Cai | ............................. 99/323.1 |

FOREIGN PATENT DOCUMENTS

| | | |
|---|---|---|
| DE | 102 47 573 A1 | 4/2003 |
| EP | 0 727 164 A1 | 8/1996 |
| EP | 0713669 | 8/1996 |
| EP | 1 016 364 A2 | 7/2000 |
| EP | 1319537 | 6/2003 |
| EP | 04 00 2983 | 12/2005 |
| WO | WO 97 39668 | 10/1997 |
| WO | WO 02/091889 A2 | 11/2002 |
| WO | WO 03/055366 A2 | 7/2003 |

* cited by examiner

*Primary Examiner*—Reginald L. Alexander
(74) *Attorney, Agent, or Firm*—Law offices of Albert Wai-Kit Chan, LLC

(57) ABSTRACT

This invention provides a simpler to use, brewing filter apparatus designed for measuring the required amount of coffee grounds or beverage mixes adapted to be mounted on a beverage- or coffee-making machine for brewing coffee grounds or beverages. Particularly, this invention relates to a filter apparatus for brewing coffee or beverage mixes, including but not limited to tea, chocolate or other flavored beverages mixes, and for making foam or froth in the brewed beverage or coffee.

7 Claims, 2 Drawing Sheets

SECTION A-A

SPOON BREWING APPARATUS

FIELD OF THE INVENTION

The present invention relates to a brewing filter apparatus designed for measuring the required amount of coffee grounds or beverage adapted to be mounted on a beverage- or coffee-making machine for brewing said coffee grounds or beverage under high- or normal/atmospheric conditions. Particularly, the present invention relates to filter apparatus adapted for making foam or froth in the brewed beverage or coffee.

BACKGROUND OF THE INVENTION

The aim of this invention is to remedy the problems normally associated with the brewing of coffee and creating a small bubble foam or froth layer, or brewing coffee without producing this small bubble foam or froth layer. Typically, coffee makers which are able to produce coffee with a small bubble foam layer, require the use of pod or pads, which are prepackaged coffee grains or grounds with filter paper.

The problem faced by the consumer is the reliance on these coffee pads, which are usually priced at a premium. The coffee pads themselves are also not as readily available as packaged ground coffee.

The spoon shaped coffee brewing apparatus was shown in U.S. Pat. No. 6,481,338, the content of which is incorporated into this application by reference, which uses a coffee grounds measuring spoon to measure the amount of coffee grounds needed per cup of coffee, and use said spoon to brew the coffee. The spoon also contains exit openings for the brewed coffee.

As measuring spoons are typically used for measuring loose or fine coffee grounds, there is no added cost of having to purchase coffee pads, nor does the consumer encounter shortages which occur as a result of the limited supply of coffee pads.

Since brewing is done in the spoon chamber, contamination of the coffee making machine is very limited and minimal, and the only part the coffee making machine which requires cleaning is the spoon filter.

In addition, since brewing is done in the spoon chamber, each coffee drinker can brew different types of coffee grounds consecutively from one machine with their own spoons.

However, the less appealing features of the previous design of the spoon shaped coffee brewing apparatus when compared to the present invention are:

1. The spoon apparatus has a seal ring on the top.
2. The spoon apparatus requires too many components thereby increasing the size and weight of the apparatus.
3. The design of the spoon apparatus results in excess water being left over the top of the coffee grounds after brewing.
4. The original spoon design requires the use of an unique locking mechanism, such as a hook. However, the present invention can be adapted to use the original locking mechanism as well as the single serve lock mechanism.

The above-described problems make the spoon apparatus clumsy and hard to use.

It is the object of the present invention to remedy the problems normally associated with the spoon shaped coffee brewing apparatus. It is another objective of the present invention to provide a brewing filter which is simpler and easier to use or cleaner, and which can be adapted for use in different single-serve coffee machines.

The present invention is easier to assemble and uses fewer components. The present invention also decreases water stay on top of the coffee inside the brewing chamber of filter apparatus during and/or after brewing. After brewing the coffee, some water will remain on top of the coffee grounds due to the lack of pressure or low pressure exerted on the remaining water which has not passed through the small hole/holes on the brewing chamber of the filter apparatus. In the present invention, the space between the water spreader and the grain coffee is reduced so that less water will stay on top or remain inside brewing chamber of the filter apparatus. The present invention also produces a small bubble foam layer without requiring the use of pods or prepackaged coffee pads.

It is still yet another object of this invention to provide a brewing filter apparatus made out of metal to make it more sturdy and rigid. The top mesh is an optional part of the brewing filter apparatus which is designed to prevent coffee grounds or beverage mixes from sticking to the water spreader and/or the seal ring on the brew head of the coffee machine. When coffee grounds adhere to the seal ring, it will induce leaking. For the user, the mesh can keep the water spreader and seal ring clean, but the use of a mesh is optional.

The foregoing objects and advantages of the present invention are illustrative of those that can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variation which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omission may be made in the following summary, which is intended to highlight and introduce some aspects of the present invention, but not to limit its scope. Detailed descriptions of a preferred exemplary embodiment adequate to allow those of ordinary skill in the art to make and use the invention concepts will follow in later sections.

According to an aspect of the present invention, a new and improved brewing filter apparatus which is designed to measure, receive and brew beverage mix or coffee is disclosed.

According to another aspect of the present invention, the brewing filter apparatus comprises a mesh, a filter, a beverage or coffee receiving container, a handle, a coffee outlet nut and a foam maker.

The operation of this brewing filter apparatus is very easy and straightforward. The said apparatus is used to scoop up the required amount of coffee grounds or beverage mix. A mesh, which is optional, is place on top of the coffee grounds or beverage mix. The said apparatus is attached to a coffee making machine and locked. The brewing filter apparatus can be adapted to brew coffee or other beverages with or without a foam or froth layer.

DETAILED DESCRIPTION OF THE FIGURE

The invention relates to a coffee spoon used to brew or extract coffee beverage from coffee grounds. The invention of this concept is shown in FIG. 1 to FIG. 2.

DETAILED DESCRIPTION OF THE INVENTION

Figure 1:
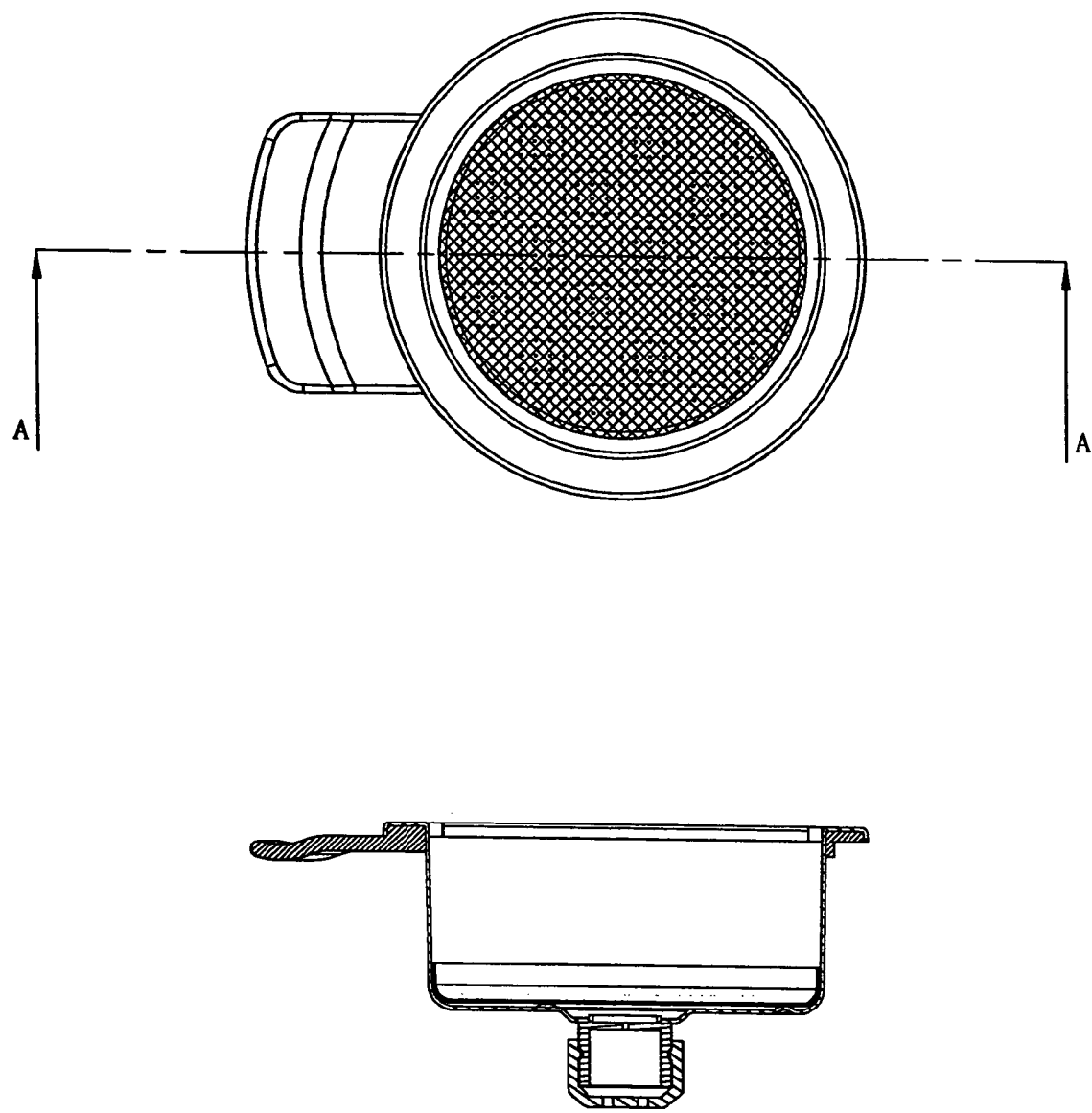
FIG. 1 is a cross-sectional illustration of the brewing filter apparatus.
Figure 2:
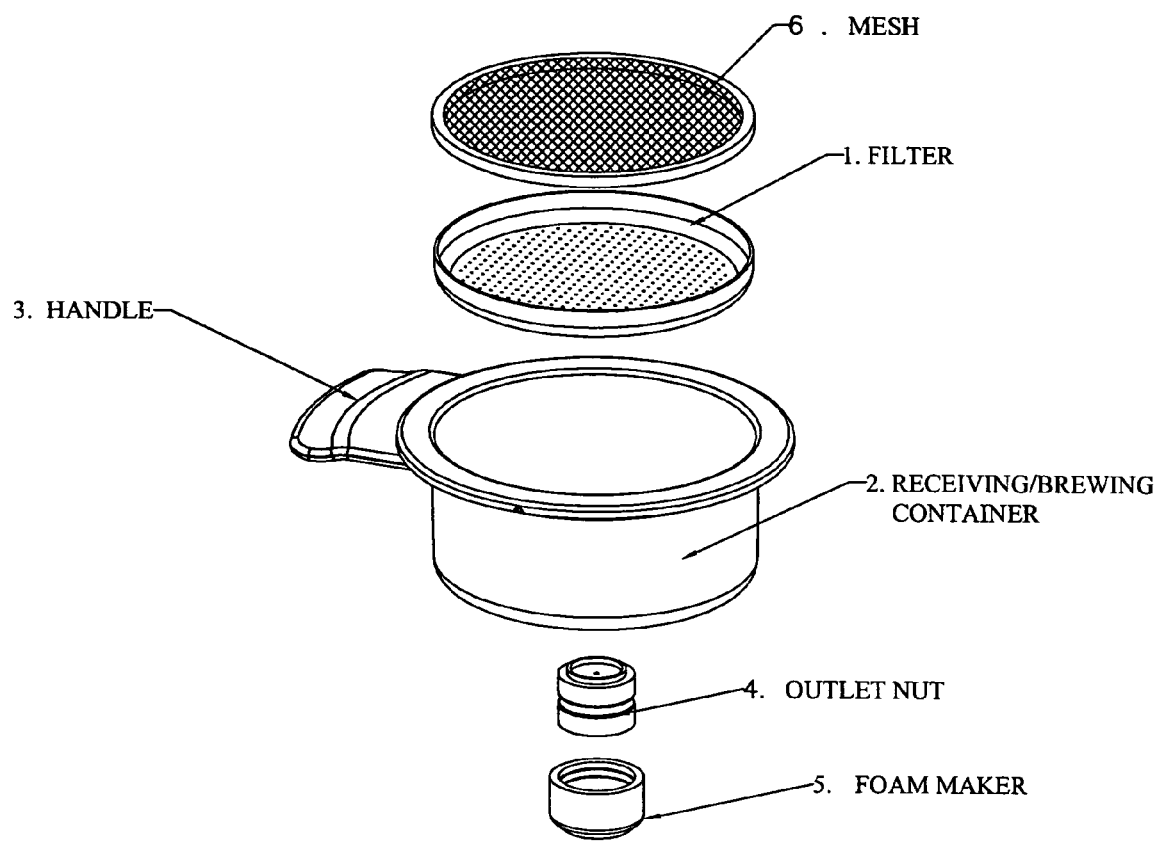
FIG. 2 is an exploded view of the brewing filter apparatus.

This invention provides a brewing filter apparatus. In an embodiment, the brewing filter apparatus adapted to be mounted on a coffee- or beverage-making machine comprises a handle attached to the receiving or brewing container, a filter, an outlet nut fixed to the receiving or brewing container and a foam maker attached to the outlet nut. In another embodiment, the above-described handle or receiving or brewing container or filter is made of a suitable material. Said material includes but is not limited to stainless steel, plastic or heat-resistant plastic. In a preferred embodiment, the brewing filter apparatus is made of a suitable metal.

In a further embodiment, the receiving/brewing container of the brewing filter apparatus is designed for obtaining and/or measuring the required amount of coffee grounds or beverage mixes needed for making the desire amount of brewed coffee or beverage. The brewing filter apparatus of the present invention can be use to brew beverages including but not limited to tea, chocolate or other flavored beverage mixes.

This invention provides a brewing filter apparatus adapted to be mounted on a coffee- or beverage-making machine, comprising a handle 3 attached to the receiving/brewing container 2, a filter 1, an outlet nut 4 fixed to the receiving/brewing container 1 and a foam maker 5 attached to the outlet nut 4.

In an embodiment, the shape of the brewing filter apparatus or the receiving/brewing container is round, square, oval or rectangular. In a preferred embodiment, the shape of the brewing filter apparatus or the receiving/brewing container is round.

The main component of the brewing filter apparatus is the coffee or beverage receiving/brewing container 2. The filter 1 is press fitted or attached using other fitting methods, such as fitting by welding or brazing, to the beverage or coffee receiving container 2. The filter 1 is used to separate the coffee grounds and the extracted/brewed coffee. The handle 3 is fixed to the beverage or coffee receiving container so that the user can hold the brewing filter apparatus. The outlet nut 4 is riveted to the center of the beverage or coffee receiving container. The outlet nut 4 has one or more small/tiny holes to create jets of brewed coffee or beverage. The size of the said holes on the outlet nut ranges from 0.8 mm to 2 mm in diameter. The foam maker 5 can make the jets of brewed coffee or beverage become foam. The foam maker 5 is mounted on the outlet nut 4, and jets of brewed coffee or beverage make contact with the bottom of the foam maker thereby creating foam. The foam maker has two or more openings on the foam chamber to let the brewed coffee or beverage and foam flow out. Foam is created because jets of brewed coffee or beverage make contact with the bottom of the foam maker. The openings on the foam maker cannot be located in the center because jets of brewed coffee or beverage need to make contact with a solid surface in order to create foam. The mesh 6 is used to cover the coffee grounds or beverage mixes, but the use of a mesh is optional. The mesh is designed to contain the coffee grounds or beverages mixes within the beverage or coffee receiving container during and after brewing. The mesh can be completely detachable or connected to the beverage or coffee receiving container using a hinge.

In an embodiment of the above apparatus, the brewing filter is adapted or modified for use on various different single serve coffee- or beverage-making machines. This is possible because the sealing component is located on the coffee- or beverage-making machines. The user can just place the coffee grounds or beverage mixes into the beverage or coffee receiving container, place the mesh cover over the coffee grounds or beverage mixes, and insert the brewing filter apparatus into the coffee- or beverage-making machine. The foam and brewed coffee or beverage will then flow out from the brewing filter.

Although the present invention has been described in detail with particular reference to preferred embodiments thereof, it should be understood that the invention is capable of other different embodiments, and its details, including but not limited to its shape, dimensions or material of construction, are capable of modifications in various obvious aspects. As is readily apparent to those skilled in the art, variations and modifications, including the shape, dimensions or material of construction of the invention can be affected while remaining within the spirit and scope of the invention. Accordingly, the foregoing disclosure, description and figures are for illustrative purposes only, and do not in any way limit the invention, which is defined only by the claims.

What is claimed is:

1. A brewing filter apparatus for a coffee or beverage device, comprising:

a handle attached to a receiving or brewing container;

a filter remove-ably mounted on the container;

an outlet nut, one end of the outlet nut is attached to the bottom portion of the container;

a foam maker attached to the other end of the outlet nut; and a foam chamber form by the inner walls of the outlet nut and the foam maker, the foam maker includes one or more exit opening to permit foam and brewed beverage to exit the foam chamber, wherein the outlet nut includes one or more opening for providing fluid communication between the container and the foam chamber, and for providing jet(s) of brewed beverage to the foam chamber, the diameter of the opening is between 0.8 to 2.0 mm, wherein the exit opening on the foam maker is positioned away from the jet(s) of brewed beverage flowing into foam chamber, and foam is created when jet(s) of brewed beverage makes contact with the bottom portion of the foam chamber.

2. The brewing filter apparatus of claim 1, further comprising a detachable mesh.

3. The brewing filter apparatus of claim 1, wherein the foam maker and the outlet nut are cast, molded, fabricated or formed as a single member.

4. The brewing filter apparatus of claim 1, wherein the handle, container, or filter is made, of a suitable metal, such as stainless steel, or a suitable plastic, such as heat resistant plastic.

5. The brewing filter apparatus of claim 1, wherein the foam maker is suitably positioned to permit one or more jets of brewed coffee or beverage to make contact with the bottom of the foam maker to produce foam.

6. The brewing filter apparatus of claim 5, wherein the foam maker comprises an exit opening.

7. The brewing filter apparatus of claim of claim 6, wherein the opening on the foam maker is positioned away from the jets of brewed coffee or beverage.

* * * * *